United States Patent [19]

Sweeney et al.

[11] Patent Number: 4,881,301

[45] Date of Patent: Nov. 21, 1989

[54] METHOD OF TYING THE OPEN END OF A BAG

[76] Inventors: Dennis R. Sweeney, 1010 N. Paradise Pl., Anaheim, Calif. 92806; Gerald E. Hefner, 16162 Norgrove Cir., Huntington Beach, Calif. 92647

[21] Appl. No.: 130,012

[22] Filed: Dec. 8, 1987

[51] Int. Cl.$^4$ ............................................. B65D 77/10
[52] U.S. Cl. ............................... 24/30.5 R; 24/16 PB
[58] Field of Search ............. 24/30.5 R, 16 R, 16 AP, 24/564

[56] References Cited

U.S. PATENT DOCUMENTS

| | | |
|---|---|---|
| 2,191,782 | 2/1940 | Valane .................................. 24/564 |
| 2,970,359 | 2/1961 | Dryden ............................... 24/16 PB |
| 3,913,187 | 10/1975 | Okuda ................................. 24/16 PB |
| 4,128,918 | 12/1978 | Wenk ................................... 24/16 R |
| 4,183,120 | 1/1980 | Thorne ................................. 24/16 R |
| 4,372,011 | 2/1983 | Aranyos ............................. 24/16 PB |
| 4,502,186 | 3/1985 | Clarke et al. ..................... 24/16 PB |
| 4,506,415 | 3/1985 | Swift ................................. 24/30.5 R |
| 4,557,024 | 12/1985 | Roberts et al. ..................... 24/16 R |
| 4,663,807 | 5/1987 | Bozzo ............................... 24/30.5 R |

Primary Examiner—Victor N. Sakran

[57] ABSTRACT

A flexible, arcuate open band having opposed tips carrying interlockable members is used to releasably tie together the open end of a transport bag.

1 Claim, 3 Drawing Sheets

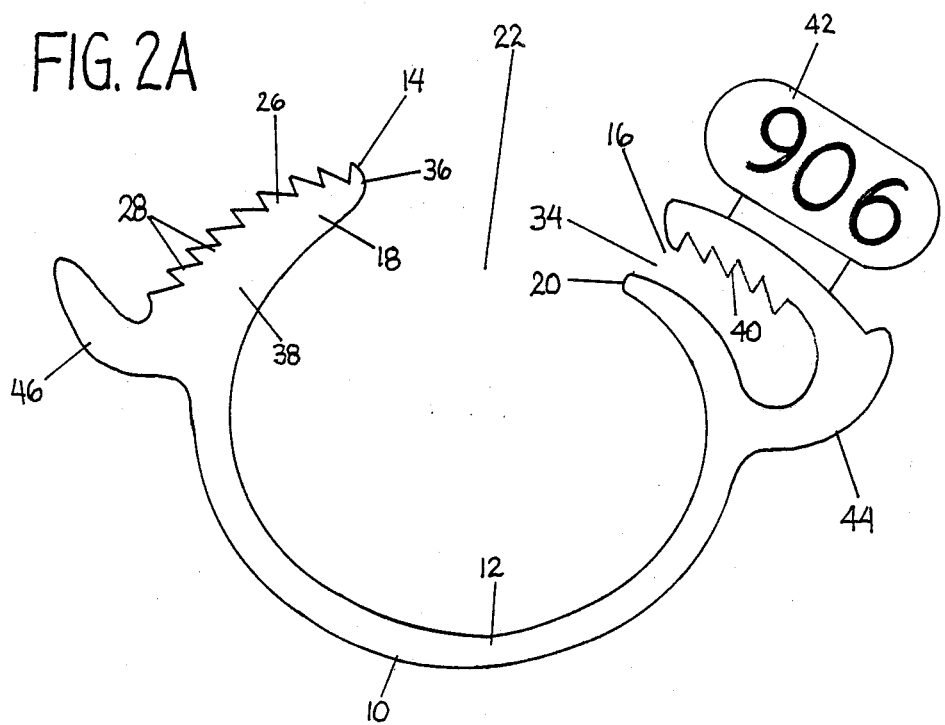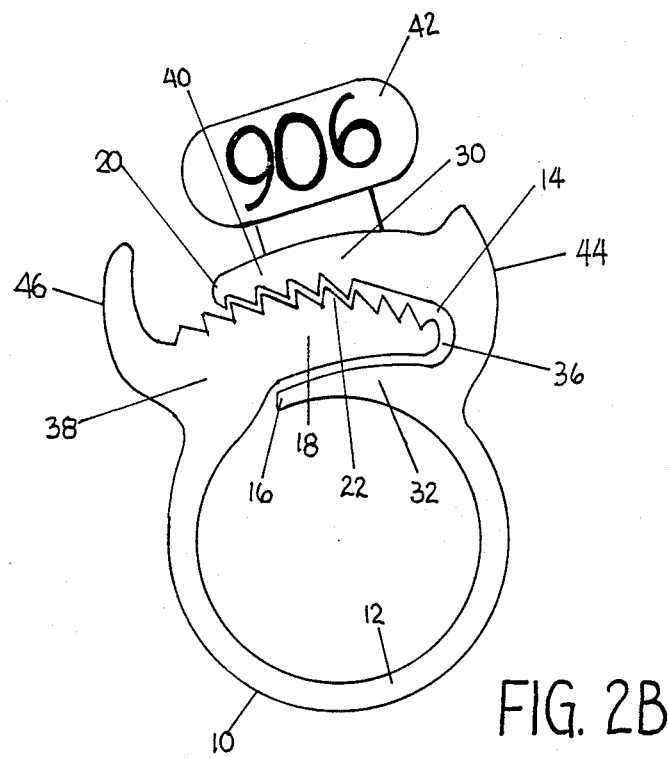

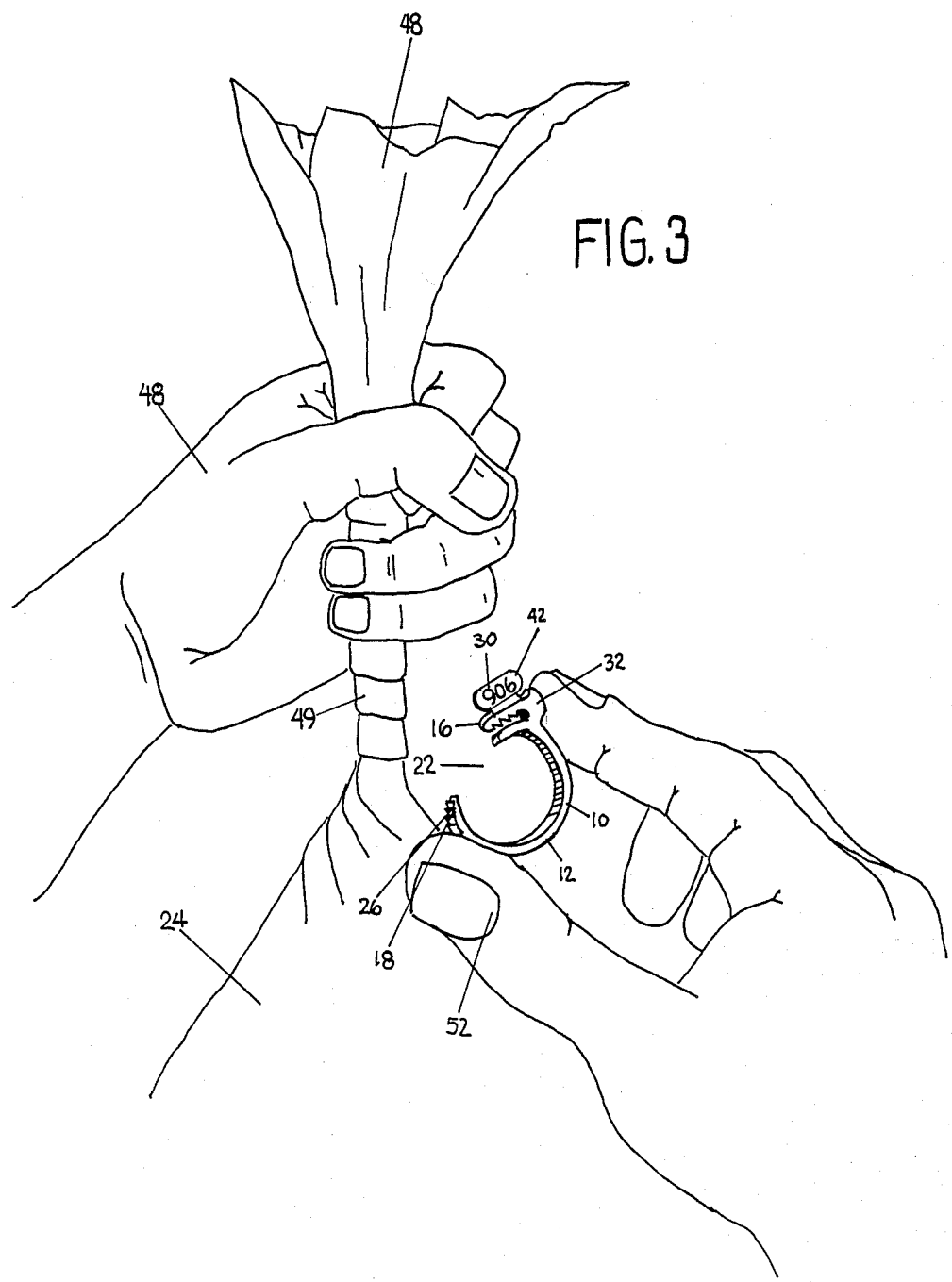

METHOD OF TYING THE OPEN END OF A BAG

BACKGROUND OF THE INVENTION

1. Field of the Invention

This invention relates to a method of tying the open end of a bag, and particularly, to such a method employing an arcuate flexible band having interlockable members at opposed ends of the band.

2. Background Discussion:

With the advent of overnight shipping, large numbers of parcels are shipped to a central processing station and placed in transport bags for rerouting to their desired delivery point. It is a common practice to employ large plastic transport bags which are placed onto and held open by a wire frame. The various parcels are placed in the open bag and, when the bag is full, the open end of the bag is closed.

It is a conventional practice to employ a rubber band with a printed paper tag attached to it which identifies the central processing station. The rubber band is formed into a loop which is wrapped around the open end to close this open end but allow it to be subsequently open. This technique presents several problems. First, it is time consuming to close the open end using the rubber band with the tag on it. Second, when the closed bag is delivered, it is difficult to open the bag. Typically, the rubber band must be cut. Considering the large volumes of packages shipped in this manner, considerably cost savings would be realized if a faster simpler method was used to close the open end of the transport bag and subsequently provide a fast, easy way to open the bag upon delivery.

SUMMARY OF THE INVENTION

The present invention provides a simple economical way of closing the open end of transport bags which facilitates quick opening upon delivery.

There are several features of this invention which contribute to its convenience and cost savings, no single one of which is solely responsible for these desirable attributes. Without limiting the scope of this invention as expressed by the claims, its more prominent features will now be discussed briefly. After considering this discussion, and particularly after reading the section entitled DETAILED DESCRIPTION OF THE PREFERRED EMBODIMENT, one will understand how the features of this invention provide the attributes of convenience and cost savings.

One feature of this invention is to employ an open, arcuate, flexible band having opposed tips carrying interlockable members. A plastic band of the type disclosed in U.S. Pat. No. 4,128,918, modified in accordance with this invention, is suitable. The band employed in this invention has a substantially distance, or gap, between the opposed tips of the band which permit the gathered together wall of the bag to be quickly inserted into the gap while gripping the band with one hand and holding the bag with the other hand. Typically, the gap distance between the tips must exceed 0.5 inch, and preferably ranges between 0.5 inch and 1.25 inch.

The second features of this invention is that one hand is used to close and lock the flexible band of the type described above. First, with one hand, the user gathers together the wall section of the bag adjacent the open end. Then, while holding the bag with this one hand, the user grips with the other hand the flexible band between the thumb and index finger and inserts the gathered together wall section between the open tips of the band. Because there is a sufficient distance between these tips, the gathered together wall section, without undue manipulation, passes between these tips and is partially encircled by the band. The user then simply pushes the tips together using the thumb and index finger to bring the interlockable members into locking engagement with each other. This forms the flexible band into a substantially annular ring which encircles the gathered together wall section of the bag and firmly grips it, closing off the open end of the bag.

The third feature of this invention is that the band has at each tip an arcuate shaped gripping member extending outwardly from the band and disposed adjacent and rearwardly of the interlockable members. These gripping members provide a site where the thumb and index finger are placed. These gripping members preferably have a serated surface against which the thumb and index finger push against to bring the tips together upon closure of the band.

The fourth feature of this invention is that one interlockable member includes a pair of lip elements extending towards the other member and spaced apart and in alignment with each other to form an open mouth structure. The other interlockable member includes a tongue element which fits snugly between the lip elements into the open structure upon bringing the tips together. The tongue element and one of the lip elements each have a plurality of teeth therein which lockingly engage upon the tips being pushed together.

The fifth feature of this invention is that the outer lip element has mounted thereon a tab which, when manually pulled outwardly without applying a transverse force to the lip elements, spreads the lip elements apart and pulls them free of the tongue element. This facilitates opening the band. Preferably, the tab also carries an identification marking on it to identify the central processing station from which the bag originated.

BRIEF DESCRIPTION OF THE DRAWINGS

The preferred embodiment of this invention, illustrating all its features, will now be discussed in connection with the accompanying drawing, in which like parts are identified by like numerals, and in which:

FIG. 2A is a front elevational view of the band in the open position.

FIG. 2B is a front elevational view of the band in the closed position.

FIG. 3 is a perspective view showing a user using the band illustrated in FIG. 1 to close the open end of a transport bag.

DESCRIPTION OF PREFERRED EMBODIMENT

Figure 1:
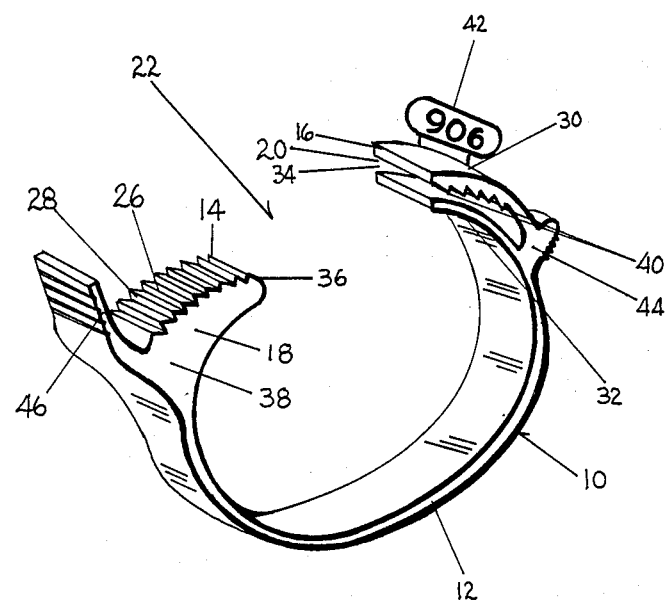
FIG. 1 is a perspective view of the band used in the bag closing method of this invention.

As shown in FIG. 1, the arcuate, flexible band 10 of this invention is an integral structure, preferably made from a polymeric material such as, for example, nylon or polypropylene, utilizing conventional injection molding processes. If the band 10 was stretched out and laid flat, its length would be almost three inches. Its width is about a quarter of an inch. Its length and width may vary somewhat according to the size of the bag 24 (FIG. 3).

The band 10 includes an arcuate strip 12 having a generally open, oval shape when in the open position with the tips 14 and 16 of the ban opposed to each other. In accordance with this invention, the strip 12 is formed into an arcuate structure with the tips 14 and 16 normally being spaced apart a distance of in excess of 0.5 inch, for example, about one inch, lying along a straight line X from tip to tip. This is important so that the gap 22 between the tips 14 and 16 will be sufficiently wide to allow a gathered together wall section (FIG. 3) of the bag to be easily inserted between these two tips. At each tip 14 and 16 is an interlockable member 18 and 20, respectively. When the strip 12 is flexed to bring the tips 14 and 16 toward each other, the interlockable members 18 and 20 engage and lock together as shown in FIG. 2B. When the band 10 is formed into a generally circular configuration, as shown in FIG. 2B, an internal bias is created in the strip 12 which will cause the band 10 to open when the interlockable members 18 and 20 are disconnected. These interlock members 18 and 20 may be disconnected by applying a transverse force to one or both of the interlock members so that they slip sideways relative to one another and disengage. This, however, is not the preferred way of opening the band 10. In accordance with this invention, a tab 42 is connected to one of the interlocking members, for example, member 20, which may be pulled generally outwardly in the plane of the band 10, rather than transversely. This will facilitate opening as required. The tab 42 may also bear an identification number indicating the central processing station from which the bag 24 originated.

The one interlockable member 18 at tip 14 comprises a tongue element 26 having a series of teeth 28 therein along its outer surface. The other interlockable member tip 16 includes a pair of lip elements 30 and 32 which extend toward the tongue element 26. The lip elements 30 and 32 are spaced apart and aligned to provide an open mouth structure 34 into which the tongue element 26 will fit snugly. In fact the tongue is designed so that it has a rounded forward section 36 which fits into the open mouth structure 34 and a wedge like body section 38 which pushes the lip elements 30 and 32 away from each other as the tongue element is inserted into the open mouth structure. The outer lip element 30 has on its inside surface a series of teeth 40 which engage the teeth 28 on the tongue element 26. The spring bias of the band 10 will pull these teeth 28 and 40 together in locking engagement until the interlockable members 18 and 20 are manually disengaged by either pulling on the tab 42 outwardly or twisting the strip 12 so that the tongue element 26 slides sideways out the side of the open mouth structure 34.

Rearwardly and adjacent the lip elements 30 and 32 is a gripping member 44 which also forms a shoulder from which the two lip elements extend. The outer surface of this gripping member 44 is rounded or arcuate and has serations therein to assist in gripping. Rearwardly and adjacent the tongue element 26 is another gripping element 46 substantially identical to the first gripping element which also provides a gripping surface.

METHOD

In accordance with this invention, the flexible band 10 is used to releasably tie the open end 48 of the bag 24 as illustrated in FIG. 3. The user first grips the open end 48 of the bag 24 with one hand near the top of the bag and with the other hand 50 pushes against the lower portion of the bag causing it to spin around and gather together the upper wall section 49 of the bag. Holding the band 10 in the other hand 50 so that the thumb 52 presses lightly against the one gripping element 46 and the index finger presses against the other gripping element 44, the user inserts the gathered together wall section 49 between the gap 22 between the tips 14 and 16 so that the strip 12 wraps partially around the gathered together wall section. With the strip encompassing the gathered together wall section 49, the user then presses against the gripping elements 44 and 46 to bring the interlockable members 18 and 20 together in locking engagement. As the forward section 36 of the tongue element 26 enters the open mouth structure 34 between the lip elements 30 and 32, the teeth 38 and 40 ride over each other and the wedge like section 38 forces the lip elements apart. As soon as the user stops pushing against the gripping elements 44 and 46, the bias of the strip 12 pulls outwardly to lock the teeth 28 and 40 together. The lower lip element 32 now has a spring bias which tends to push against the underside of the tongue element 26. This tends additionally to hold the tongue element in locking engagement with the lip elements 30 and 32.

Upon arrival at the point of destination, the user who is to open the bag 24 simply holds the bag with one hand and with the other hand 50 grasps the tab 42 and pulls outwardly. This causes the two lip elements 30 and 32 to separate a sufficient distance so that the tongue element 26, under the biasing spring action of the strip 12, springs out from the open mouth structure 34.

SCOPE OF THE INVENTION

The above description presents the best mode contemplated of carrying out the present invention as depicted by the preferred embodiment. The combination of features illustrated in the preferred embodiment provides the convenience and economic advantages of this invention. This invention is, however, susceptible to modifications and alternate constructions and variations from the embodiment shown in the drawing and described above. Consequently, it is not the intention to limit it to the particular embodiment disclosed. On the contrary, the intention is to cover all modifications, alternate constructions and variations falling within the scope of the invention as generally expressed by the following claims.

We claim:

1. A method of tying the open end of a bag comprising the steps of:
    (a) gathering the wall of the bag together at an open end of the bag to close said open end,
    (b) manipulating with one hand an open, arcuate, flexible band made of plastic and having opposed tips to insert the gathered bag wall between the opposed tips, which are spaced apart a distance exceeding 0.5 inch so that the gathered bag be readily inserted between said tips each of said tips having an interlocking member thereat, one member including a pair of flexible inner and outer lip elements extending toward the other member and spaced apart and aligned with each other to form an open mouth structure, and a tab carried on said outer lip element, and the other member including a tongue element which fits snugly between said lip elements in said open mouth structure, so that said members engage and releasably lock together upon said tips being pushed together manually, and
    (c) with said one hand pushing the tips together to engage the interlockable members and encompass the gathered bag wall with the band and wherein with one hand the tab is grasped and pulled to peel away the outer member from the tongue element to open the band.

* * * * *